United States Patent [19]

Bates

[11] 4,349,041

[45] Sep. 14, 1982

[54] CONTROL VALVE SYSTEM FOR BLOWOUT PREVENTERS

[75] Inventor: H. John Bates, Santa Ana, Calif.

[73] Assignee: NL Industries, Inc., New York, N.Y.

[21] Appl. No.: 67,609

[22] Filed: Aug. 20, 1979

[51] Int. Cl.$^3$ .......... F16K 31/12

[52] U.S. Cl. .......... 137/1; 91/420; 91/436; 251/1 R; 251/1 A; 251/1 B; 251/31

[58] Field of Search .......... 137/1; 91/420, 436; 251/1 R, 1 B, 1 A, 31

[56] References Cited

U.S. PATENT DOCUMENTS

| | | | |
|---|---|---|---|
| 1,812,587 | 6/1931 | Ellis | 91/436 X |
| 3,036,807 | 5/1962 | Lucky et al. . | |
| 3,044,481 | 7/1962 | Regan . | |
| 3,299,957 | 1/1967 | O'Neill et al. . | |
| 3,759,144 | 9/1973 | Ikeda | 91/436 |
| 4,098,341 | 7/1978 | Lewis . | |

*Primary Examiner*—Gerald A. Michalsky

[57] ABSTRACT

A control valve system and method are disclosed for blowout preventers having an actuating piston for actuating the closing of the blowout preventer whereby the piston has an opening side and a closing side. The control valve system and method include a means for selectively directing fluid from the opening side of the actuating piston to the closing side of the actuating piston in order to reduce the fluid requirements for closing the blowout preventer and reduce in stalled horsepower requirements thereby.

7 Claims, 5 Drawing Figures

CONTROL VALVE SYSTEM FOR BLOWOUT PREVENTERS

BACKGROUND OF THE INVENTION

1. Field of the Invention

The invention relates generally to control valve systems and more particularly, it concerns a control valve system for opening and closing blowout preventers.

2. Description of the Prior Art

Two major classes of blowout preventers are currently utilized to shut off uncontrolled flow of pressurized fluid in applications such as oil and gas wells—ram-type blowout preventers and spherical blowout preventers. In the operation of a spherical blowout preventer, a working fluid is injected on the closing side of a built-in piston to force the piston against a flexible closure element, thereby expanding the element into the flow path to cut off flow. In a ram-type blowout preventer, a hydraulic cylinder having a rod attached to its piston is utilized to move a ram, which acts as the closure element to close the passage of the pressurized fluid. While the discussion, below, focuses on the latter class of blowout preventers, it should be apparent to those of skill in the art that it applies equally to spherical blowout preventers.

Cylinder-piston-and-rod operator devices (operator cylinders) have long been utilized as operators for blowout preventers. These devices generally include a closed cylinder with a piston, slidably mounted inside the cylinder, and a rod, secured to the piston and extending out of one end of the cylinder. The piston and cylinder, therefore, had a blind side and a rod side as designated by the location of the rod.

In the past, these operators functioned hydraulically by injecting fluid into the cylinder on the blind side in order to move the piston and rod to an extended position so that the rod operated the blowout preventer closure means to close off flow from the well. Fluid contained in the cylinder on the rod side of the system was, in turn, vented back to a reservoir upon the motion of the piston to the end of the cylinder from which the rod extended. Such operation demanded great volumes of fluid to move the piston and rod from a fully open position to a fully closed position. Moreover, since installed horsepower, i.e. the horsepower required to fully move the piston, is equal to the volumetric flow through the pump multiplied by the pressure in the lines, this large fluid requirement also created a large horsepower requirement on the pumping device used to move the fluid.

Accordingly, many attempts have been made to reduce the horsepower and fluid requirements of such an operator. In U.S. Pat. No. 3,360,807 to Lucky, a valve apparatus is illustrated which is designed to utilize the downhole pressure created by a blowout to aid in closing the blowout preventer. This device is believed to be disadvantageous, however, in that it uses whatever fluid or substance may be downhole as its driving fluid. Hence, drilling mud or other fluid with suspended debris is circulated through the valve. Such driving fluid is believed to present the disadvantage of potentially clogging the valve mechanism thereby preventing effective operation of the apparatus.

In U.S. Pat. No. 3,299,957 to O'Neil, a fluid control system is shown in FIG. 18 comprising an accumulator cylinder utilized in conjunction with the pump means. In particular, the pump means is continuously operated to effectively raise the piston and pressurize the accumulator. The purpose of this system, however, is to allow the use of a lower horsepower input pump rather than to minimize overall horsepower requirements and fluid requirements. In fact, fluid expelled from the pistons during the lowering motion of the pistons is exhausted to a liquid reservoir each time the pistons are lowered. Hence, the control valve system illustrated in O'Neil apparently utilizes greater fluid and greater installed horsepower than normal systems.

Other systems utilizing accumulators are shown in U.S. Pat. No. 4,098,341 and U.S. Pat. No. 3,044,481. All of these systems are believed to utilize greatly excessive amounts of hydraulic fluid thereby increasing the amount of horsepower required for operation.

Other attempts are believed to have been made to reduce the overall horsepower requirements, but these have involved costly modifications to the blowout preventer structure.

Hence to provide an improved control valve system, it is necessary to provide a system requiring less power to operate the system while also minimizing hydraulic fluid requirements on the system.

SUMMARY OF THE INVENTION

The present invention overcomes the prior art disadvantages through a control valve system for blowout preventers including a fluid return system for selectively directing the fluid from the opening side of the piston of a blowout preventer to the closing side of the piston. For simplicity, the invention will be described in detail for a ram-type blowout preventer. It should be understood, however, that the control valve system is equally applicable to spherical blowout preventers wherein the closing side of the piston in a spherical blowout preventer corresponds to the blind side of the operator piston of a ram-type preventer and the opening side corresponds to the rod side.

Accordingly, the present invention overcomes the prior disadvantages through a control valve system for operator cylinders having a piston member slidably mounted in the cylinder and a rod secured to the piston and extending out one end of the cylinder, whereby the piston and cylinders have a blind side and a rod side. The control valve system includes a fluid return system for selectively directing the fluid from the rod side of the piston to the blind side of the piston upon introduction of the pressurized fluid to the blind side of the piston. This transfer of fluid from the rod side of the piston to the blind side of the piston reduces fluid capacity requirements and installed horsepower requirements by reducing the amount of fluid which must pass through the pump.

In a preferred embodiment, the fluid return system for selectively directing the fluid from the rod side of the piston to the blind side of the piston includes a directional flow control system and a pressure sensitive switching system.

In one aspect of one preferred embodiment, the directional flow control system includes a control cylinder with sliding piston contained therein. The first end of the control cylinder communicates with the blind side of the operating cylinder, while the second end communicates with a chamber cylinder. The control cylinder further communicates at a point along its length with the rod side of the operating cylinder so that movement of the control cylinder piston between the first end and the second end of the control cylinder places the rod side of the operator cylinder in communication with either the blind side of the operator cylinder or with the chamber cylinder.

The directional flow control system of this aspect of the preferred embodiment further includes a switching cylinder which functions to selectively displace the control cylinder piston from the second end of the control cylinder to the first end of the control cylinder so that after a predetermined pressure is reached, flow from the rod side of the operating cylinder will be discharged into a reservoir. The switching cylinder communicates at one end with the pressure sensitive switching system and at the other end, with the chamber cylinder.

The pressure sensitive switching system of this aspect of the preferred embodiment includes a pressure relief valve which functions to release flow to the switching cylinder when a predetermined pressure is reached on the blind side of the operator cylinder. This, in turn, acts to redirect the flow from the rod side of the operator cylinder to a reservoir instead of to the blind side of the operator cylinder. The back pressure on the rod side of the piston is accordingly relieved, allowing the pump to fully close the blowout preventor.

The switching system additionally includes a unidirectional floating ball check valve which permits the flow of the fluid having passed through the relief valve to the switching cylinder to re-enter the control valve system on the upstream side of the relief valve.

In an alternative embodiment of the invention, the directional flow control system includes a directional flow valve in communication with the rod side of the operator cylinder, the blind side of the operator cylinder and with a discharge line. A plurality of flow direction sensors communicate with the directional flow valve to actuate the changing of the mode of the valve for the desired flow pattern. The pressure sensitive switching system includes at least one pressure sensor in communication with both the blind side of the operator piston and the directional flow valve so that the sensor may effect the desired change in the mode of the selector valve upon the blind side of the operator cylinder obtaining a predetermined pressure.

The instant invention also provides a method of decreasing driving fluid capacity requirements and horsepower requirements for operator cylinders. The steps included in this method are first, injecting fluid into the operator cylinder on the rod side of the piston in order to move the piston into a fully open position away from the rod end of the cylinder. Once the piston is fully retracted and the operator cylinder is full of fluid on the rod side of the piston, fluid is selectively injected under pressure into the blind side of the operator cylinder in order to move the operator piston to close the blowout preventer. The fluid forced from the rod side of the cylinder is then selectively directed into the blind side of the cylinder until a predetermined pressure is obtained on the blind side of the piston. When this pressure is reached, the fluid being forced from the rod side of the cylinder is then directed to discharge from the control valve system, typically back to the reservoir.

In a preferred aspect of the method, the control valve system includes a directional flow control system and a pressure sensitive switching system. With this aspect of the method, fluid is first directed into the directional flow control system in order to position it in a retracted position. Then, pressurized fluid is injected into the directional flow control system so that the directional flow control device is selectively positioned to direct fluid from the rod side of the operator cylinder to the blind side of the operator cylinder. The pressurized fluid is also simultaneously injected into a pressure sensitive switching device in order to accommodate the monitoring of the pressure of the system. When the system reaches a pressure which necessitates relief of back pressure on the operating piston, then the directional flow control system is selectively set to direct fluid from the rod side of the operator cylinder to a reservoir.

In a more limited aspect of the method, the directional flow control system and pressure sensitive switching system may comprise either a directional flow valve in communication with a plurality of pressure and flow sensors as described below, or the directional flow control system may include the control cylinder, the chamber cylinder and the switching cylinder as described above while the pressure sensitive switching system further includes the pressure relief valve and the unidirectional floating ball check valve. With this latter arrangement, the method is then characterized by injecting fluid into the chamber cylinder whereby the control cylinder piston is forced to the first end of the control cylinder and the switching cylinder piston is positioned so that free movement of the control cylinder piston is allowed. The fluid then passes through the chamber cylinder through the control cylinder to the operating cylinder where it enters the rod side of the operator cylinder and retracts the piston to a fully open position.

When desired, such as when a blowout is experienced, pressurized fluid is next selectively introduced into the cylinder on the blind side of the piston, into the control cylinder in its first end and into the the pressure relief valve and unidirectional floating ball check valve. The fluid entering the control cylinder pushes the control cylinder piston to the second end of the control cylinder thereby directing flow of fluid forced from the rod side of the operator cylinder into communication with the blind side of the operator cylinder. Hence, the fluid from the rod side of the piston is utilized to fill the cylinder on the blind side of the piston thereby lessening both horsepower requirements and fluid capacity requirements.

Once a predetermined pressure level is reached in the blind side of the operator cylinder, typically that pressure at which the pump can no longer overcome the back pressure exerted by the fluid on the rod side of the operator cylinder, the pressure relief valve will open allowing pressurized fluid to communicate with the switching cylinder. The switching cylinder piston will operate to displace the control cylinder piston to the first end of the control cylinder, thereby redirecting flow from the rod side of the operating cylinder through the control cylinder and through the chamber cylinder to a reservoir. This will relieve the back pressure created by the fluid from the rod side of the operating cylinder thereby allowing the pump to fully close the operating cylinder.

In the alternative control valve system, the directional flow control system may include a directional flow valve in communication with the operating cylinder on the rod side of the piston, with the operating cylinder on the blind side of the piston, and with a discharge. The directional flow control system further comprises a monitoring system to detect the direction of input of fluid to the system and adjust the position of the directional flow valve to the proper mode. The directional flow valve may have a flow through mode wherein the discharge is in communication with the rod side of the operator cylinder and a return mode wherein the rod side of the operator cylinder is placed in communication with the blind side of the operator cylinder. The pressure sensitive switching system of this control valve system includes a pressure sensor in communication with the blind side of the piston to detect when the predetermined pressure level is reached.

This method is then characterized by directing fluid into the discharge where it is sensed and the directional flow valve is adjusted into the flow through position to allow the flow of the fluid into the rod side of the cylinder to fill the cylinder on that side and fully retract the piston in the open position. Pressurized fluid is then selectively injected into the cylinder on the blind side of the piston where it is sensed and a signal is generated causing the directional flow valve to be adjusted into the return position. Fluid forced from the movement of the piston in the operator cylinder is then directed from the rod side of the cylinder to the blind side of the cylinder thereby again conserving fluid and horsepower.

Once the pressure in the system on the blind side of the cylinder attains the predetermined pressure level, the pressure sensor sends another signal which overrides the first signal and readjusts the directional flow valve into the flow through position so that flow is directed from the cylinder from the rod side of the piston through the discharge to discharge from the control valve system.

It is important to notice in the above apparatus and methods that the force created by the the introduction of pressurized fluid on the blind side of the piston will not be negated by the force of the back pressure caused by the communication of the rod side of the operator cylinder with the blind side of the operator cylinder due to the differential areas between the rod side of the piston and the blind side of the piston. That is, since the rod of the operating piston extends out of the cylinder, the effective area on which pressure may be exerted in the direction of piston movement will differ by the ratio of the areas on the rod side of the piston and the blind side of the piston. Since the rod side of the piston has a lesser effective area due to the rod's not being subject to the normal forces in the direction of movement of the pressurized fluid, the rod side of the piston will always have a lesser effective surface area than the blind side of the piston. Hence flow will always tend to circulate from the rod side of the piston to the blind side of the piston when pressurized fluid of equal pressure is introduced on both sides. The instant invention therefore functions due to the differential forces generated by the essentially equal pressures exerted on different surface areas.

It should be mentioned that the same analysis holds true for spherical blowout preventers. That is, the cross-sectional surface area of the extension from piston body on the opening side of the piston which forces against the flexible member to expand it is also not subject to the normal forces that the corresponding area on the closing side of the piston are subject to. Hence, spherical blowout preventers demonstrate the same differential force response as ram-type preventers and will therefore function in the same manner.

Accordingly, the present invention overcomes the previously discussed problems of excessive fluid requirements and excessive installed horsepower requirements by utilizing the fluid contained in the operator cylinder on the rod side of the piston to fill the cylinder on the blind side of the piston, thereby lowering the amount of fluid required to be pumped through the pump and decreasing the fluid and horsepower requirements.

BRIEF DESCRIPTION OF THE DRAWINGS

This invention will further be illustrated by reference to the appended drawings which illustrate particular embodiments of the control valve system in accordance with this invention.

DESCRIPTION OF THE PREFERRED EMBODIMENTS

Figure 1:
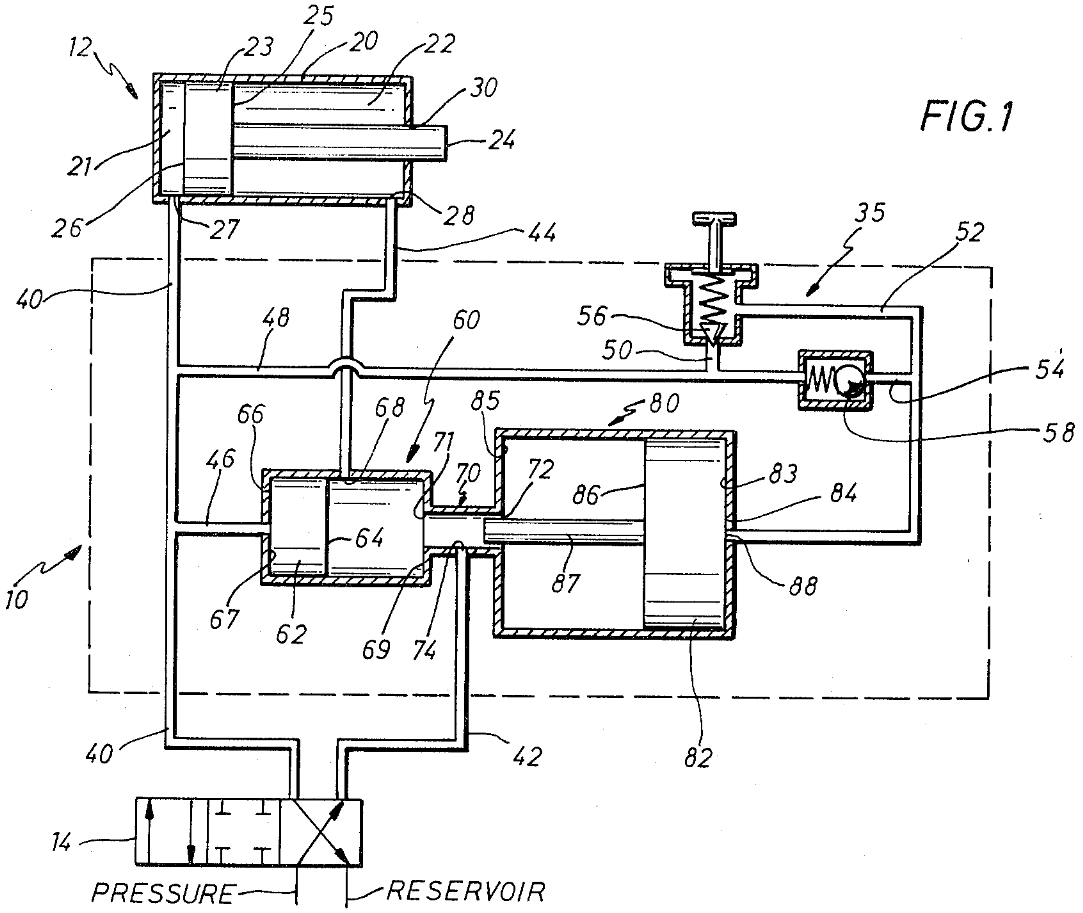
FIG. 1 is a schematic view of the control valve system for operator cylinders, which uses hydraulic fluid as the power means for the directional flow control system, in the fully open position.

This invention relates to an operator cylinder-control valve system particularly suitable for use with a blowout preventer, such as a ram or shear type on a drill rig.

The operator cylinder and control valve system are generally represented by a control valve system 10, an operator cylinder apparatus 12 and a four way selector valve 14. The four way selector valve 14 has three modes: a retracting mode wherein pressurized fluid from a pressurized fluid source (not shown) is in communication with the blind side 21 of the operator cylinder 20 and the chamber cylinder 70 is in communication with a reservoir (not shown); a closing mode wherein the pressurized fluid source is in communication with the chamber cylinder 70 and the operator cylinder 20 communicates with the reservoir; and a neutral position wherein there is no flow through the valve.

The operator cylinder assembly 12 comprises operator cylinder 20, operator piston 23 slidably mounted in operator cylinder 20 for longitudinal movement along the cylinder, and operator rod 24 secured to one side of operator piston 23 and extending out of one end of the operator cylinder.

The operator piston 23, is slidably mounted in operator cylinder 20 so that it may reciprocate from one end of the cylinder to the other. The operator piston 23 has a rod side 25, corresponding to the side on which the rod is secured, and a blind side 26, opposing the rod side 25. Accordingly, operator piston 23 divides operator cylinder into two volumetric sections, a blind side 21 of the cylinder and a rod side 22 of the cylinder with the volume of these two sections varying with the movement of the operator piston 23. The operator piston 23 may comprise any configuration which snugly fits the inner diameter of the operator cylinder 20 so as to preclude or minimize oil flow from the blind side 21 of the cylinder to the rod side 22 of the cylinder and vise versa and such that it exhibits stability with relation to its position in the bore upon the application of pressure to piston 23. In the preferred embodiment, the operator piston 23 comprises a solid disc of outer diameter substantially equal to the inner diameter of operator cylinder 20.

Operator cylinder 20 comprises a closed, hollow cylinder having a rod aperture 30 in one end, a rod side aperture 28 located near the end with the rod aperture 30, and a blind side aperture 27.

In the preferred embodiment, operator rod 24 comprises a solid cylindrical rod having a diameter such that the cross sectional surface area of the rod 24 is less than the surface area of the blind side of the piston 23. Operator rod 24 is concentrically secured to operator piston 23 by welding or other suitable means and, in the preferred embodiment, is of sufficient length such that it extends through rod aperture 30 when the operator piston 23 is in the fully open positon near to or abutting the end opposing the end with the rod aperture 30.

In the preferred embodiment, control valve system 10 comprises a directional flow control cylinder 60, a chamber cylinder 70, a switching cylinder 80, a pressure relief valve 56, and a unidirectional floating ball check valve 58.

Directional flow control cylinder 60 comprises a hollow cylinder having a retracted end 67 and return end 69. The return end 69 has a chamber cylinder aperture 71 located in its center, the aperture having sufficient diameter to substantially align with the diameter of the chamber cylinder 70. Retracted end 67 communicates with the blind side aperture 27 of operator cylinder 20 by means of a control cylinder pressure line 46 and a closing line 40.

Directional flow control cylinder 60 further comprises a control cylinder piston 62 having a retracting side 64 and a flow return side 66. In the preferred embodiment, control cylinder piston 62 is comprised of a disc shaped member of sufficient diameter so that it snugly fits the inner diameter of control cylinder 60 and of suitable width so that pressure on either side of the piston 62 will not cause it to tilt. Hence, control piston 62 is slidably mounted inside of control cylinder 60.

Directional flow control cylinder 60 additionally has an aperture 68 located at a point approximately midway along its length, by which it communicates with the operator cylinder 20 at the rod side aperture 28 by means of a rod side line 44. The location of the point of communication of rod side line 44 and aperture 68 should be such that the sliding of control piston 62 to the retracted end 67 directs flow from the rod side 22 of the operator cylinder 20 to the switching cylinder aperture 71 and the chamber cylinder 70. Moreover, upon the sliding of control piston 62 toward the return end 69 of control cylinder 60, the flow from the rod side 22 of the operator cylinder 20 should then be placed in communication with the blind side 21 of the operator cylinder 20 by means of the control cylinder 60, control cylinder pressure line 46 and closing pressure line 40.

Chamber cylinder 70 is comprised of an open cylinder having an inner diameter which is less than the inner diameter of control cylinder 60. In the preferred embodiment, chamber cylinder 70 is secured to control cylinder 60 at return end 69 in concentric alignment with the longitudinal axis of the control cylinder 60. A retracting pressure line 42 is further secured to and in communication with chamber cylinder 70 at discharge aperture 74 which is located approximately midway along the length of chamber cylinder 70. The retracting pressure line 42 also communicates with four way selector valve 14, thereby providing the means of communication between four way selector valve 14 and chamber cylinder 70. The length of chamber cylinder 70 is not critical, but should be minimized in order to minimize hydraulic fluid requirements of the system.

Referring to FIG. 1, switching cylinder 80 is connected to chamber cylinder 70 so that it is in concentric alignment with the longitudinal axis of chamber cylinder 70 and control cylinder 60. Switching cylinder 80 comprises a low pressure end 83 having a high pressure inlet 88 and a high pressure end 85 having a switching rod aperture 72. The diameter of the switching rod aperture 72 is substantially equal to the inner diameter of chamber cylinder 70 and is in alignment with chamber cylinder 70.

Switching cylinder 80 further comprises switching piston 82, having a high side 84 and a low side 86 with the high side 84 corresponding to the high pressure inlet 88 and the low side 86 corresponding to the chamber cylinder 70 as to communications with fluid sources.

Switching rod 87 is secured to the low side of the switching piston 82 and is comprised of a solid cylindrical rod extending perpendicularly from the center of switching piston 82. The diameter of switching rod 87 is smaller than the inner diameter of chamber cylinder 70 so that switching rod 87 may both pass through chamber cylinder 70 to abut against control piston 62 and so that fluid may flow around switching rod 87 through chamber 70 into both control cylinder 60 and switching cylinder 80 when such flow is permitted. The length of switching rod 87 should be sufficient so that when switching piston 82 is abutted against the high pressure end 85 of switching cylinder 80 and switching rod 87 is abutted against control cylinder 60, the control cylinder piston 62 will have been pushed to the retracted end 67 of the control cylinder 60. This, in turn, will allow communication from the rod side 22 of operator cylinder 20 to the control cylinder 60 by means of the rod side line 44 and, to the chamber cylinder 70 and return line 42.

It is important that the inner diameter of switching cylinder 80 be substantially equal to the outer diameter of switching piston 82 so that flow from one side of switching piston 82 to the other side is minimized or precluded entirely. Also, the diameter of switching piston 82 should be larger than the diameter of control piston 62 so the pressure exerted on the high side 84 of switching piston 82 will create a larger force than that exerted by fluid under equal pressure on the flow return side 66 of control piston 62.

Referring to FIG. 1, control valve system 10 also comprises a pressure sensitive switching system 35. This system comprises a biased pressure relief valve 56 which may be regulated to vary the pressure required to urge it away from its seated position as shown in FIG. 1. Valve 56 is in communication with the blind side aperture 27 of operator cylinder 20 by means of pressure sensing line 48 and closing pressure line 40. The pressure relief valve 56 is additionally in communication with relief line 52 which connects with the inlet aperture 88 of the switching cylinder 80 and with check valve return line 54.

The pressure sensitive switching system 35 may also comprise a unidirectional spring-biased, floating ball check valve 58 which communicates by means of check valve line 50 with the pressure line 48 and closing pressure line 40 and with relief line 52 by means of check valve return line 54 so that pressure in pressure sensing line 48 will tend to close check valve 58 unless a greater pressure is introduced into the floating ball valve return line 54 to overcome that pressure. It should further be apparent to those of skill in the art that other suitable check valves may be utilized to restrict flow in one direction.

Accordingly, when the apparatus in the preferred embodiment is utilized, four way selector valve 14 is placed in the retracting mode so that fluid is introduced into line 42. The fluid then passes into chamber cylinder 70 where it is directed into both switching cylinder 80 and control cylinder 60. As shown in FIG. 1, this fluid forces switching piston 82 to the low pressure end 83 of switching cylinder 80 and control piston 62 to the retracted end 67 of control cylinder 60. Fluid then flows through the rod side line 44 to operator cylinder 20 and enters the rod side 22 of operator cylinder 20 where it forces operator piston 23 to a fully open position away from the end with rod aperture 30 and fills the rod side 22 of operator cylinder 20.

Four way selector valve 14 may then placed in the neutral position so as to preclude further flow into either side of operator cylinder 20 or left in the retracting mode to keep the blowout preventer fully retracted or open.

Figure 2:
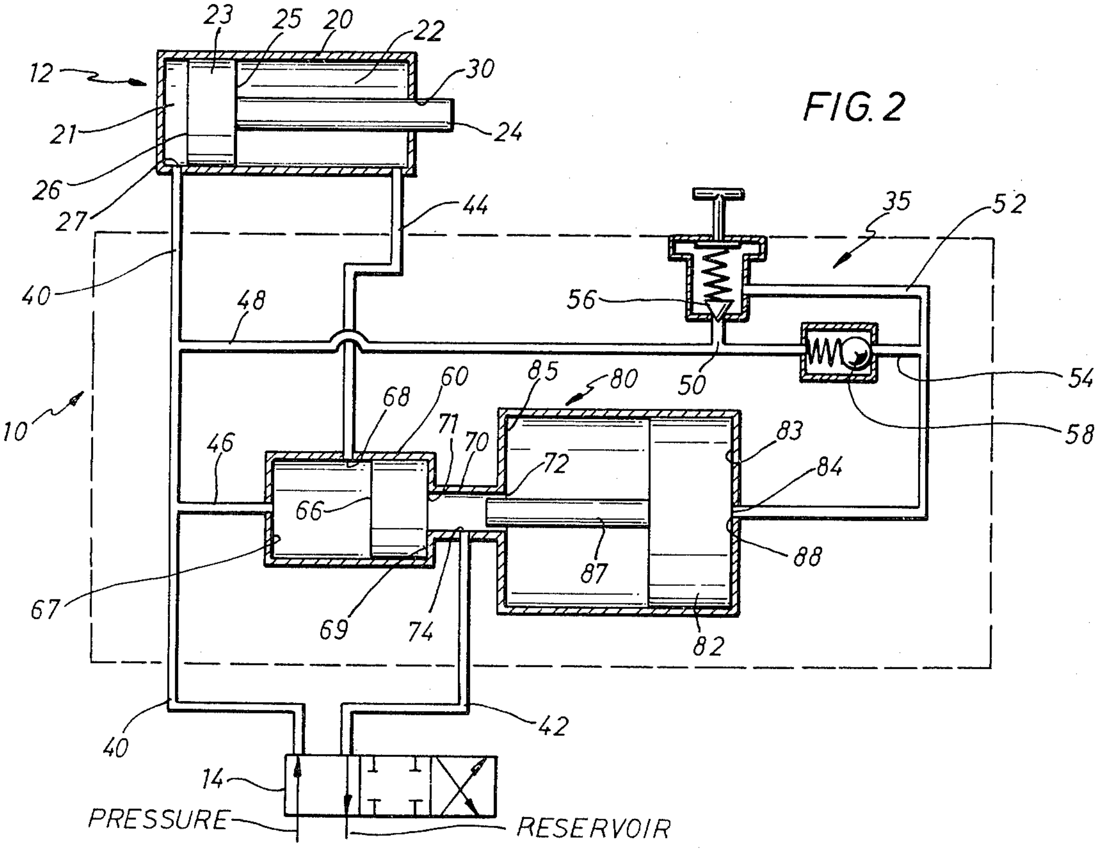
FIG. 2 is a schematic view of the system of FIG. 1 in the closing mode for low pressure operation.

When desired, such as when a blowout is experienced, four way selector valve 14 is next placed in the closing mode and fluid is directed into closing pressure line 40. The fluid then enters control cylinder pressure line 46, pressure sensing line 48, and the first aperture 27 of operator cylinder 20. Since this operation will be utilized when it is desirous to force operator rod 24 against a retarding pressure, the path of least resistance for the flow of fluid among the three points of entry will be the flow into control cylinder 60. Hence, as shown in FIG. 2, control piston 62 will move from the retracted end 67 of control cylinder 60 to the return end 69 very shortly after the introduction of the pressurized fluid into the closing pressure line 40.

Once control piston 62 abuts against either switching rod 87 or the return end 69 of control cylinder 60, the pressurized fluid in the closing pressure line 40 will tend to flow both into the blind side of the operating cylinder 20 and through rod side line 44 via control cylinder 60 into the rod side 22 of operator cylinder 20. Due to the difference in surface areas between the blind side 26 and the rod side 25 of operator piston 23, the force on the operator piston 23 will be greater on the blind side 26 of piston 23. The piston 23 will therefore move toward the rod aperture end of the operating cylinder 20 forcing fluid from the rod side 22 of operator cylinder 20 down line 44 and back into closing pressure line 40.

It is important to notice that the difference in the force exerted on each side of the piston will vary directly with the effective areas on each side of the piston. That is, since the rod extends out of operator cylinder 20, the surface area on rod side 25 of piston 23 available for pressure normal to the surface in the direction of movement will be less than the surface area available for pressure normal to the surface on the blind side 26.

Accordingly, the movement of piston 23 to the end having the rod aperture will then force fluid through rod side line 44 into the control cylinder 60 where it will pass through control cylinder pressure line 46 into closing pressure line 40 and back into the blind side 21 of operator cylinder 20, rather than back to the reservoir. Hence, the fluid required to be pumped from a reservoir through a pump into the operator cylinder 20 will be decreased in part by the volume of fluid in the rod side 22 of operator cylinder 20.

Figure 3:
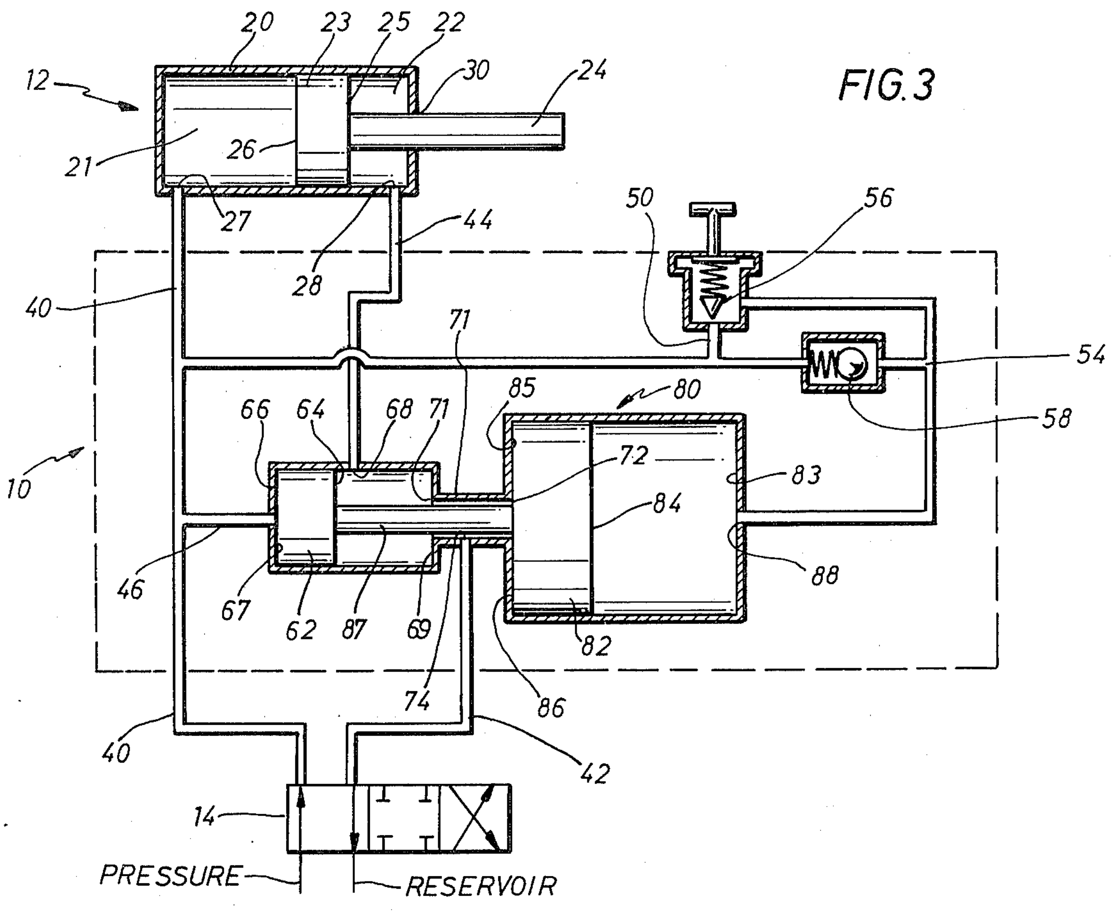
FIG. 3 is a schematic view of the control valve system of FIG. 1 illustrating the system in the mode for high pressure operation.

There will be applications, however, where the pressure against the operating rod 24 will be great enough so that the pressure of the fluid on the blind side of piston 23 will reach the predetermined setting for valve opening of pressure relief valve 56. Since closing pressure line 40 and pressure sensing line 48 are in direct communication with the operator cylinder 20 on blind side 21, the pressure on the pressure relief valve 56 will be substantially equal to the pressure in the operating cylinder 20 on the blind side of the piston. At such a point, pressure relief valve 56 will open to allow fluid to flow through pressure relief line 52 into check valve return line 54 and high pressure inlet 88. Since the pressure from pressure sensing line 48 will be equal to the pressure in check valve return line 54, floating ball check valve 58 will not provide the path of least resistance thereby forcing the fluid into switching cylinder 80. As shown in FIG. 3, switching piston 82 will then be forced to the high pressure end 85 of switching cylinder 80 due to the surface area of high side 84 of switching piston 82 exceeding the surface area of flow return side 66 of control piston 62. The movement of switching piston 82 will, in turn, force control piston 62 to the retracted end of control cylinder 60 by means of switching rod 87. Fluid flow from the rod side 22 of operator cylinder 20 will then flow down rod side line 44 through the control cylinder 60 into chamber cylinder 70 and out retracting pressure line 42.

The control valve system will remain in this mode until the operator piston 23 and rod 24 complete their operation.

ALTERNATIVE EMBODIMENT

Figure 4:
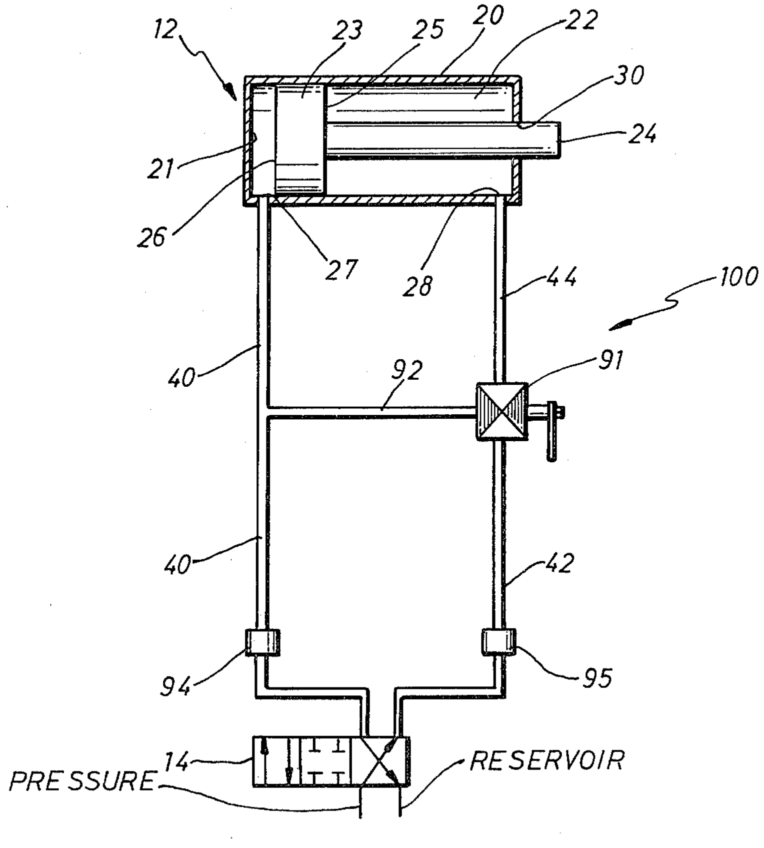
FIG. 4 is a schematic view of a control valve system utilizing a directional flow valve and pressure sensors as the directional flow control system and pressure sensitive switching system.

FIG. 4 shows an alternative embodiment of the control valve system in accordance with this invention. In this embodiment, the operator cylinder and four way selector valve perform the same function as that described for the embodiment of FIGS. 1–3 and accordingly, identical parts shall be given identical numbers to those given in FIGS. 1–3.

Referring to FIG. 4, control valve system 100 comprises directional flow valve 91, flow return line 92, closing pressure sensor 94 which functions both as a high pressure sensor and a flow direction sensor, and retracting pressure sensor 95.

Directional flow valve 91 may comprise any suitable three way selector valve or a plurality of valves to function as a three way selector valve wherein fluid may be selectively directed in any one of three directions. The directional flow valve 91 may have a flow through mode in which rod side line 44 communicates with retracting pressure line 42 while at the same time communication with these two lines is precluded from lines 92 or 40; a return mode wherein rod side line 44 is placed in communication with return line 92 and closing pressure line 40; and neutral mode allowing no flow. Directional flow valve 91 may be operated by electrical, pneumatic, hydraulic or other suitable means.

Accordingly, when the apparatus in this embodiment is utilized, fluid is injected into retracting pressure line 42 where it passes through retracting flow pressure sensor 95. Pressure sensor 95 triggers the movement of directional flow valve 91 to the retracting mode through electrical or other suitable means so that flow from retracting pressure line 42 continues through rod side line 44 into the rod side 22 of operating cylinder 20. The fluid fills the rod side 22 of operating cylinder 20 and forces piston 23 to a fully open position away from the rod aperture end.

The four way selector valve 14 may then be placed in the neutral position or left in the retracting mode until it is desired to close the operating cylinder.

When desired, fluid is then selectively injected into closing pressure line 40 where it passes through pressure sensor 94, which in turn triggers a signal causing directional flow valve 91 to switch to the return mode so that rod side line 44 is placed in communication with return line 92. Pressurized fluid will then enter both sides of operating cylinder 20 as described for the embodiment in FIGS. 1 through 3 and as explained in that embodiment the operating piston 23 will move toward the rod aperture end until the back pressure on rod 24 reaches a predetermined pressure level.

When the back pressure on rod 24 reaches the predetermined level, pressure sensor 94 will sense that level and override its earlier signal thereby switching the directional flow valve 91 to the retract position. Fluid from the operating cylinder 20 will then flow down retracting pressure line 42 instead of back to the blind side of operator cylinder 20 thereby allowing completion of the operation.

SPHERICAL BLOWOUT PREVENTERS

Figure 5:
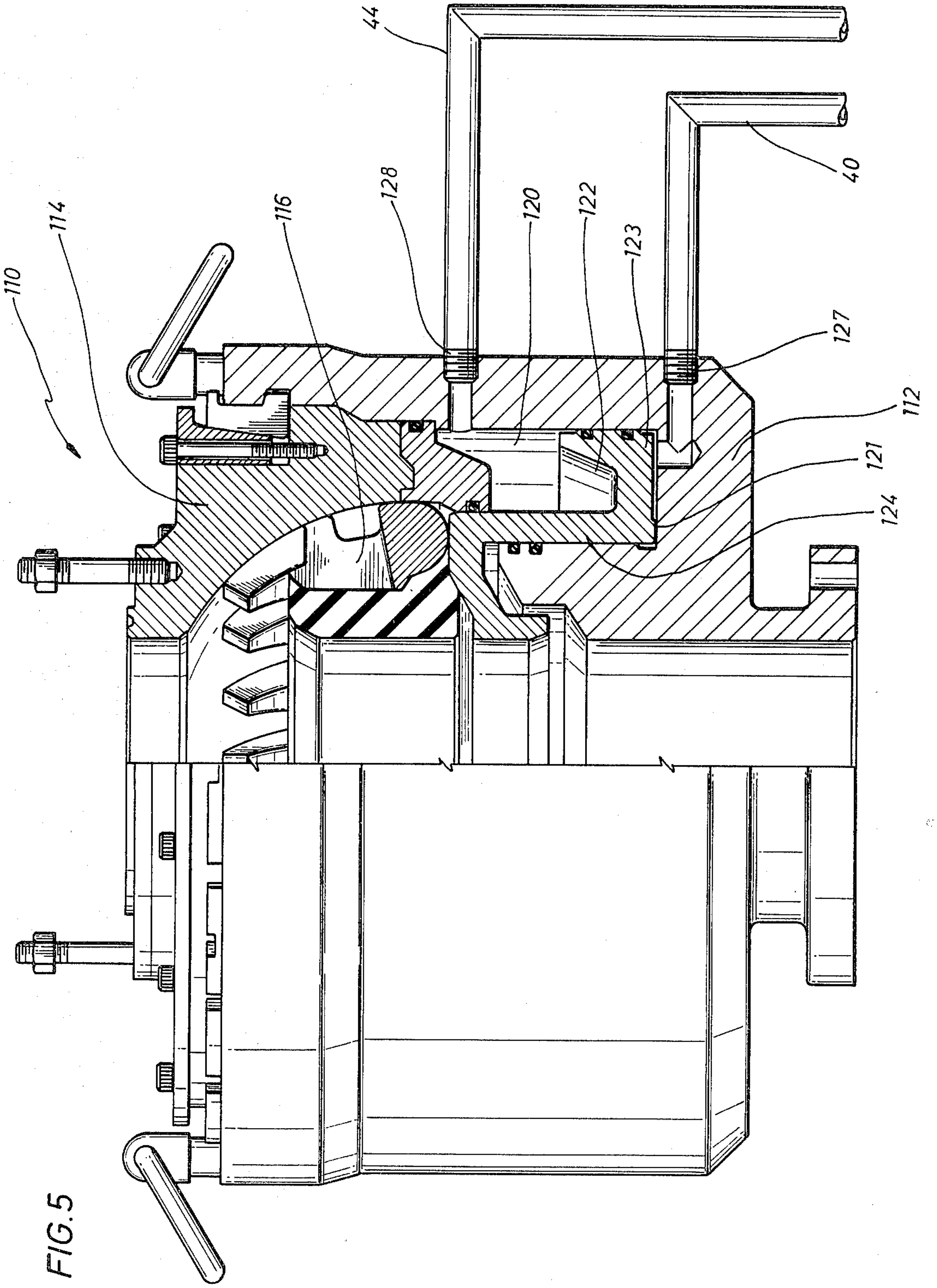
FIG. 5 is a cutaway view of a spherical blowout preventer illustrating the connection of the control valve system thereto.

FIG. 5 illustrates an appropriate connection of the alternative embodiments of the present invention to a typical spherical blowout preventer. In particular, there is shown a wedge-cover spherical blowout preventer 110 comprising a lower housing 112 having an annular recession 120, a closing aperture 127, and an opening aperture 128; an annular piston 123 slidably mounted in annular recession 120 having an opening side 122 and a closing side 121; a closure extension 124 connected to the opening side 122 of piston 123; a closure element 116 in communication with the closure extension 124 and an upper housing 114 connected to lower housing 112.

Hence, in operation, the annular recession 120 corresponds with the operator cylinder 20 of FIGS. 1-4. Further, annular piston 123 corresponds with piston 23, closure extension 124 with rod 24, closing aperture 127 with blind side aperture 27, opening aperture 128 with rod side aperture 28, closing side 121 with blind side 21 and opening side 122 with rod side 22 in FIGS. 1-4.

Accordingly, the preferred embodiments of the control valve system of FIGS. 1-4 may be connected to spherical blowout preventer 110 by placing the rod side line 44 in communication with opening aperture 128 and the closing pressure line 40 in communication with closing aperture 127 as shown in FIG. 5. The operation of the control valve system will then be identical to that described for the ram-type blowout preventer of FIGS. 1-4, above.

From the above, it can be seen that the present invention provides a control valve system which may be utilized with blowout preventers having a piston arrangement for actuating the closing of the preventer so long as the opening side of the piston has a smaller effective area than the closing side.

The instant invention has been disclosed in connection with specific embodiments. However, it will be apparent to those skilled in the art that variations for the illustrated embodiment may be taken without departing from the spirit and scope of the invention. For example, a mechanical pressure relief valve could be inserted in the second embodiment to serve the function of the high pressure sensor and allow flow directly from the operator cylinder to a discharge. Additionally, a combination of pressure sensors and pneumatic piston cylinder arrangements could be utilized to redirect the flow when desired. Further, switching of the valve and cylinders could be effected by solenoids or other suitable means. These and other variations will be obvious to those skilled in the art and are within the spirit and scope of the invention.

What is claimed is:

1. In a method of reducing fluid capacity requirements and installed horsepower requirements of blowout preventers having an actuating piston for actuating the closing of the blowout preventer, the piston having a closing side and an opening side of smaller effective area than the closing side, the steps of:

(a) injecting fluid on the opening side of the actuating piston in order to move the actuating piston to an open position;

(b) selectively injecting fluid under pressure on the closing side of the actuating piston in order to initiate the movement of the actuating piston to close the blowout preventer;

(c) selectively directing the fluid forced from the opening side of the actuating piston by the movement of the actuating piston in step (b) to the closing side of actuating piston until a predetermined pressure is obtained in the system; and (d) after a predetermined pressure is developed in the system, redirecting the fluid forced from the opening side of the actuating piston to discharge to a reservoir.

2. The method of claim 1, characterized during the performance of step (a) by simultaneously injecting fluid into a directional flow control system in order to position it in a retracted position; then, during the performance of step (b), injecting the pressurized fluid both (i) into the directional flow control system, so that the directional flow control system is selectively set to direct fluid from the opening side of the actuating piston to the closing side of the actuating piston, and (ii) into a pressure sensitive switching device in order to accommodate the monitoring of the pressure of the system; then, during the performance of step c, directing the fluid forced from the opening side of the actuating piston to the closing side of the actuating piston by means of the directional flow control system until the predetermined pressure is reached in the system and then readjusting the directional flow control device to accommodate the performance of step (d).

3. The method of claim 2, wherein the directional flow control system comprises a control cylinder, having a bore with an inner diameter, a return end, and a retracting end, and a control cylinder piston slidably mounted in the control cylinder for longitudinal movement, the piston having a longitudinal width of less than one-half the length of the control cylinder and a configuration which snugly fits the inner diameter of the control cylinder, the control cylinder further communicating with the opening side of the actuating piston at a point along the length of the control cylinder which accommodates the communication of fluid from the opening side of the actuating piston into the control cylinder when the control cylinder piston is at either end of the control cylinder; a chamber cylinder in communication with the closing end of the control cylinder, the chamber cylinder having a longitudinal bore of diameter smaller than the inner diameter of the control cylinder; a switching cylinder having a high pressure end, a low pressure end, a longitudinal bore of diameter greater than the inner diameter of the control cylinder, the high pressure end of the switching cylinder communicating with the chamber cylinder; a switching cylinder piston slidably mounted in the switching cylinder for longitudinal movement having an effective surface area greater than the effective surface area of the control cylinder piston and a configuration which snugly fits the inner diameter of the bore of the switching cylinder; a switching rod connected to the switching cylinder piston, the rod having a location and dimension smaller than the inner dimensions of the chamber cylinder so that it can pass through the chamber cylinder into the control cylinder to push the control cylinder piston to its retracting end upon movement of the switching cylinder piston to its high pressure end and so that fluid may pass around the switching rod through the chamber cylinder when it enters the chamber cylinder; and wherein the pressure sensitive switching system includes a pressure relief valve having an inlet port and on outlet port, the outlet port communicating with the low pressure end of the switching cylinder; a check valve comprising an open end and a closed end, the open end communicating with the relief valve at the outlet port and the low pressure side of the switching cylinder; characterized during the performance of step (a) by injecting the fluid into the chamber cylinder whereby the fluid passes to the control cylinder and the switching cylinder in order to force the control cylinder piston to the retracting end and the switching cylinder piston to the low pressure end and whereby the fluid then passes through the control cylinder to the opening side of the actuating piston and forces the actuating piston to an open piston; then, during the performance of step (b), injecting the pressurized fluid substantially simultaneously into the control cylinder on the retracting end, into the pressure relief valve in the inlet port, into the check valve in the closed end and into the closing side of the actuating piston in order to force the control cylinder to the return end of the control cylinder to accommodate the performance of step (c) until the predetermined pressure is obtained; then, when the predetermined pressure is reached, opening the relief valve so that the passage of fluid through the relief valve moves the switching cylinder piston to the high pressure end of the switching cylinder thereby moving the control cylinder piston to the retracting end in order to direct fluid forced from the opening side of the actuating piston through the control cylinder and the chamber cylinder to discharge to a reservoir.

4. The method of claim 2, wherein the directional flow control system comprises a discharge line; a directional flow valve in communication with the the closing side of the actuating piston, with the opening side of the actuating piston, and with the discharge line, the directional flow valve having a flow-through mode, wherein the opening side of the actuating piston communicates through the directional flow valve with the discharge line, and a flow-return mode, wherein the opening side of the actuating piston communicates with the closing side of the actuating piston; and monitors for sensing flow direction input in communication with the discharge line and the closing side of the actuating piston in order to selectively adjust the directional flow valve into the desired mode; and wherein the pressure sensitive switching system comprises a pressure sensor in communication with the closing side of the actuating piston and the directional flow valve, characterized during the performance of step (a) by injecting the fluid into the discharge line, monitoring the flow in the discharge line and adjusting the directional flow selector valve to the flow-through mode in order to allow flow to the opening side of the actuating piston; then, during the performance of step (b), injecting the pressurized fluid to the closing side of the actuating piston, monitoring the flow on the closing side of the actuating piston and readjusting the directional flow valve to the flow-return mode in order to direct fluid forced from the opening side of the actuating piston to the closing side of the actuating piston; then, during the performance of step (c), sensing the pressure by the pressure sensor and switching the directional flow valve to the flow-through mode when the pressure reaches a predetermined level in order to accommodate the performance of step (d).

5. For use with blowout preventers having an actuating cylinder and piston for actuating the closing of the blowout preventer, the piston having a closing side and an opening side of smaller effective area than the closing side, a differential pressure control valve system comprising:

a directional flow control system for selectively directing flow from the opening side of the actuating piston alternatively to the closing side of the actuating piston and to a discharge point upon the closing of such a blow out preventer, including a control cylinder having a bore with inner diameter, a return end, and a retracting end, the retracting end being in communication with the closing side of the actuating piston, a control cylinder piston slidably mounted in the control cylinder for longitudinal movement, the piston having a longitudinal width of less than one-half the length of the control cylinder and a configuration which snugly fits the inner diameter of the control cylinder, wherein the control cylinder further communicates with the opening side of the actuating piston at a point along the length of the control cylinder which accommodates the communication of fluid from the opening side of the actuating piston into the control cylinder when the control cylinder piston is at either end of the control cylinder, and a switching mechanism for selectively moving the control cyliner piston from one end to the other; and a pressure sensitive switching system operatively associated with the directional flow control system for selectively varying the alternative flow paths of the directional flow control system at a predetermined pressure level.

6. The control valve system of claim 5, wherein the switching mechanism comprises:

a chamber cylinder in communication with the closing end of the control cylinder, the chamber cylinder having a longitudinal bore of diameter smaller than the inner diameter of the control cylinder and further having a discharge aperture located along its length for the input and discharge of fluid;

a switching cylinder having a high pressure end in communication with the chamber cylinder, a low pressure end, and a longitudinal bore of diameter greater than the inner diameter of the control cylinder;

a switching cylinder piston slidably mounted in the switching cylinder for longitudinal movement having an effective surface area greater than the effective surface area of the control cylinder piston and a configuration which snugly fits the inner diameter of the bore of the switching cylinder;

a switching rod operatively associated between the switching cylinder piston and the control cylinder piston, the rod having outer dimensions smaller than the inner diameter of the chamber cylinder in order to permit flow around the rod and having a configuration and location such that the switching rod passes through the chamber cylinder between the control cylinder piston and the switching cylinder piston to push the control cylinder piston to its retracted end upon movement of the switching cylinder piston to its high pressure end.

7. The control valve system of claim 6, wherein the pressure sensitive switching system comprises:

a pressure relief valve in communication with the low pressure end of the switching cylinder and with closing side of the actuating piston;

a check valve in communication with both the relief valve and the low pressure side of the switching cylinder and with the closing side of the actuating piston.

* * * * *